June 10, 1958 L. C. POCOCK 2,838,612

TELEPHONE SUBSCRIBER'S INSTRUMENTS

Filed Feb. 2, 1955 2 Sheets-Sheet 1

Inventor
L. C. POCOCK
By Robert Harding Jr.
Attorney

June 10, 1958 L. C. POCOCK 2,838,612

TELEPHONE SUBSCRIBER'S INSTRUMENTS

Filed Feb. 2, 1955 2 Sheets-Sheet 2

Inventor
L. C. POCOCK
By Robert Harding Jr.
Attorney

United States Patent Office 2,838,612

Patented June 10, 1958

2,838,612

TELEPHONE SUBSCRIBER'S INSTRUMENTS

Lyndall Crossthwaite Pocock, London, England, assignor to International Standard Electric Corporation, New York, N. Y., a corporation of Delaware Application February 2, 1955, Serial No. 485,707

Claims priority, application Great Britain February 8, 1954

6 Claims. (Cl. 179—81)

This invention relates to telephone subscribers' instruments, hereinafter referred to as "subsets."

In the type of subset in common use anti-side-tone arrangements are provided whereby a transmitter of the carbon granule type and a receiver are connected in conjugate relationship in a bridge circuit in which the line constitutes one arm and another arm comprises an artificial balancing network which balances the bridge for a predetermined line impedance. The bridge circuit is of the type which incorporates a transformer (commonly called an "induction coil"), and with such circuits it is theoretically possible to secure the desired conjugate relationship between transmitter and receiver without loss except that which is inherent in the passage of part of the transmitter output current through the branch which includes the balance network.

The induction coil is an expensive item and it is proposed to replace it by a resistance bridge. This involves transmission losses due to the power dissipated in the resistors.

It is further proposed to offset these losses and to gain other advantages hereinafter described, by the use of a crystal triode, commonly called a "transistor," to amplify the output of the transmitter.

According to the invention there is provided telephone subscribers' instrument of the anti-side-tone type which does not comprise an induction coil but which comprises a transmitter and crystal amplifier circuit in conjugate relationship with a receiver; line circuit terminals for connection to a line circuit, and a balancing network in conjugate relation to the line circuit terminals; and two resistive ratio arms forming, with said two sets of conjugate pairs, a Wheatstone bridge.

There is no pressing need to amplify line signals applied to the receiver, and in general the losses due to the resistive bridge can be tolerated for two reasons namely:

(1) Sensitive receivers are available; and (2) It is not so difficult to receive adequate signals over long lines as it is to transmit signals over such lines as, in the latter case, a reduction of the D. C. energising power fed to the transmitter over the line has to be suffered in addition to the attenuation of the transmitted signals.

The invention will be more readily understood from the following detailed description of certain embodiments of the invention illustrated in the accompanying drawings in which.

In all these drawings certain elements usually found in a subset, such as dial springs, gravity switch springs etc. are omitted as they do not contribute to the invention and their placing, in a subset circuit according to the invention, is well within the competence of those skilled in the art.

Figure 1:
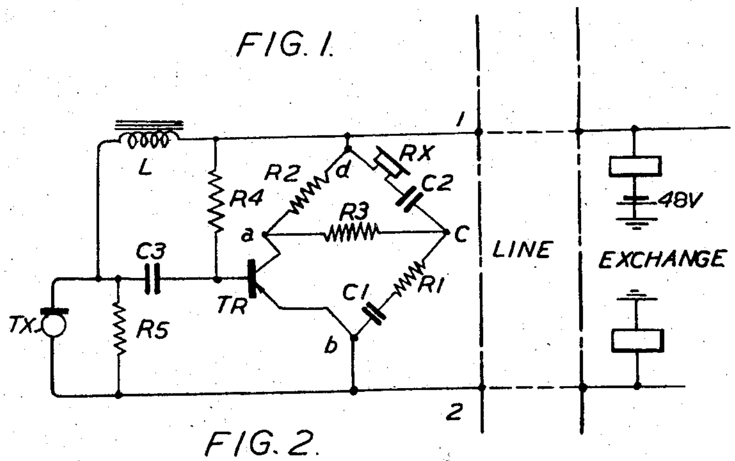
Fig. 1 is a circuit diagram of one embodiment of the invention.

In Fig. 1 the circuit of a subset is shown connected over a line to a central battery exchange providing a line voltage of 48 volts through the usual line relays, as shown, or through a transmission bridge. The circuit to the left of the chain dotted lines is the subset circuit.

A carbon granules transmitter TX receives energising current from the line through an inductance L, which may be the windings of the bell or part of them, to save a separate coil. The transmitter is also connected via a series capacitor C3 across the base-emitter circuit of a transistor TR which may be of the type described in British Patent specification No. 694,021. The D. C. supply for the collector-emitter circuit of the transistor TR is obtained from the central exchange battery via the line and resistor R2. The base of TR is biassed through a resistor R4 connected to the line terminal 1 of the subset, the emitter being connected to line terminal 2.

The transmitter TX is shunted by a resistor R5 which is provided so that if the transmitter is removed or becomes exceptionally high in resistance, there is a fixed resistance path for the current and the transistor is protected from excessive voltage.

Figure 2:
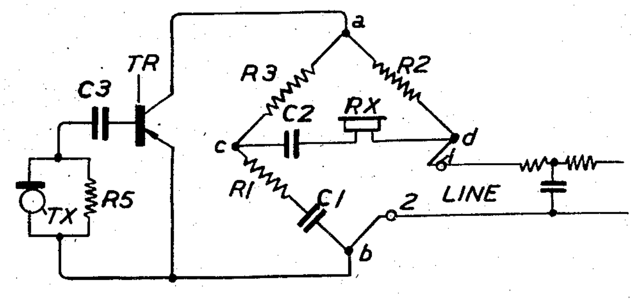
Fig. 2 is a simplified and re-arranged circuit diagram of the embodiment shown in Fig. 1.

The amplified transmitter signals from the emitter-collector circuit of TR are fed across the diagonal points of an anti-side tone bridge circuit to be described in relation to Fig. 2. The portion of the amplified transmitter signal which reaches the line takes the course: terminal 2, TR emitter, TR collector, R2, terminal 1—R2 being one of the arms of the resistive anti-side tone bridge circuit. Whilst the presentation of the circuit according to Fig. 1 shows the D. C. feed and bias arrangements more clearly, the bridge circuit and the conjugate relationship of the transmitter and transistor on the one hand and the receiver RX on the other hand appear more clearly if the circuit elements are re-arranged according to Fig. 2, from which inductance L and resistor R4 have been omitted.

To facilitate comparison between Figs. 1 and 2, certain junction points in the bridge circuit are designated respectively *a*, *b*, *c* and *d* in both figures.

The transistor emitter-collector output is applied across the diagonal *ab* of the bridge circuit and divides itself between two branches of the bridge circuit, one branch consisting of a resistor R3 in series with a line balancing network consisting of resistor R1 in series with capacitor C1, and the other branch consisting of resistor R2 in series with the line to the exchange. The complexity of the line balancing circuit will depend on the degree of balance it is desired to obtain, and R1 might be replaced by other elements, though in practice they would be mainly resistive. The receiver RX in series with a capacitor C2 is connected across the opposite diagonal of the bridge, from *c* to *d*, and is not traversed by current from the transistor output signals when the bridge is balanced. Capacitor C2 isolates the receiver from D. C. The path for signals to the receiver follows the course: terminal 1, RX, C2, R1, C1, terminal 2.

For perfect balance and therefore zero side tone the impedance ratio of the arms *ac*:*cb* must equal the impedance ratio of the arms *ad*:*db*, where arm *db* is the "line impedance" that is, the impedance of the line measured at line terminals 1 and 2, which depends not only on the line length but also to some extent on the impedance terminating the line at the exchange end. It has been found convenient to make R2 and R3 equal in value and to make the impedance of arm *bc* equal to the predetermined line impedance at which maximum side-tone suppression is desired, but in general this equality cannot be achieved over a range of frequencies and is not essential, and the choice of values for the arms of the bridge is at best a compromise between the relative transmitting and receiving losses and the maintenance of suitable voltages at the electrodes of the transistor. It may for example be desired to increase receiving efficiency at the expense of transmitting efficiency and this can be done by the choice of unequal ratio arms in the bridge and modification of the arm *bc*. In such a case the lost transmitting efficiency can be made good by increased amplification, or conversely, transmitting efficiency can be increased at the expense of receiving efficiency.

Figure 3:
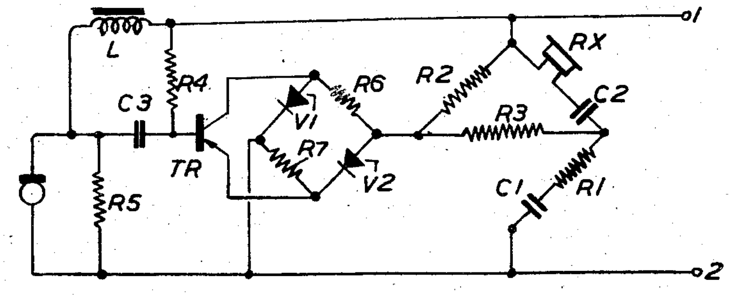
Fig. 3 is a circuit diagram of a second embodiment of the invention.

The arrangement of Figs. 1 and 2 lends itself to the addition of line equalising arrangements and Fig. 3 shows a way of achieving this by the use of a potential divider network comprising two non-linear resistances V1 and V2 (hereinafter called "varistors") and two fixed resistors R6 and R7.

The varistors are shown in the drawings as rectifiers, but symmetrical varistors such as silicon carbide elements may be used.

On long lines, when the voltage received over the line is low, the resistance of V1 is relatively high and the voltage at the junction of R6 and V1 approaches that of terminal 1. Conversely the resistance of V2 being relatively high, the voltage of the junction of V2 and R7 approaches that of terminal 2. Thus the D. C. voltages applied to the transistor TR approach the maximum possible for the available line voltage. On short lines, when the line voltage is high, the resistances of V1 and V2 are greatly reduced, and the voltages at the junctions of R6, V1 and R7, V2, approach equality giving minimum and ultimately zero applied D. C. voltage. By suitable combination of these two effects the voltage applied to TR may be held approximately constant regardless of changes of line resistance and thereby the operation and stability of TR may be more perfectly controlled.

Also the network is bridged across the collector-emitter circuit of TR and an A. C. transmission loss occurs on short lines when the resistance of V1 and V2 is low. This transmission loss assumes negligible proportions on long lines when the resistance of V1 and V2 is high. In Fig. 3 the full voltage available at the line terminals is used to energise the transmitter.

Figure 4:
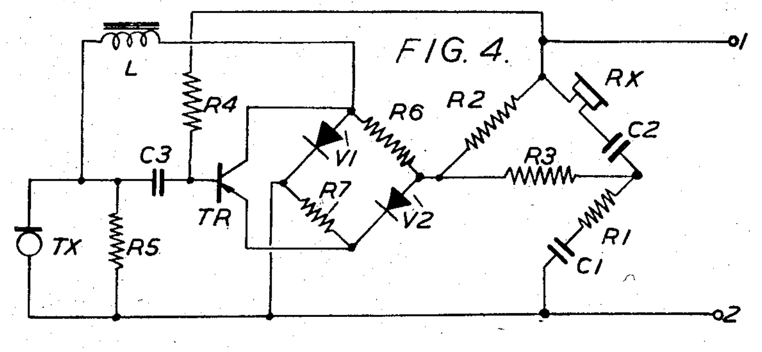
Fig. 4 is a circuit diagram of a third embodiment of the invention.

Fig. 4 shows a modified arrangement in which the upper side of the transmitter is connected (via L) to the junction of R6, V1 so that the transmitter energising voltage as well as the transistor feed voltages are controlled by the equalising network. This multiplies the effectiveness of the network in lowering the transmitting level on short lines.

Figure 5:
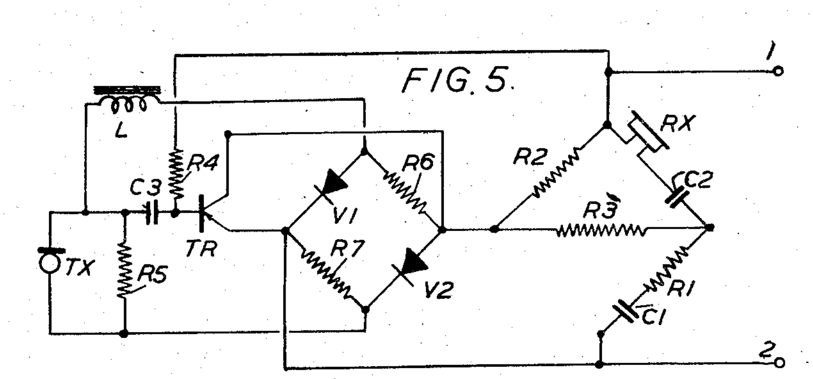
Fig. 5 is a circuit diagram of a fourth embodiment of the invention.

Fig. 5 shows an alternative arrangement where the transistor feed voltages are not controlled by the network V1, V2, R6, R7, only the transmitter energising voltage being so controlled.

In a practical circuit according to Figs. 1 and 2, the following values for the circuit components have been found to give optimum results: R1=1000 ohms, R2=600 ohms, R3=600 ohms, R4=16,000 ohms, R5=100 ohms, C1=2$\mu$fd, C2=2$\mu$fd, C3=2$\mu$fd, resistance of L=500 ohms. These values give optimum performance on a 1000 ohms line having a reactance of the order usually found in lines of this resistance.

With these values the transmitter current is about 12 ma. as compared with about 30 ma. for a similar transmitter when used in a conventional subset connected to a similar line. As a result of this there is a reduction in transmitter output of the order of 7 db as compared with the conventional subset circuit. On the other hand, in an ideal conventional subset the speech voltage V across the line impedance Z is related to the E. M. F., E, of a transmitter with impedance T by the formula $$\frac{V}{E}=\sqrt{\frac{Z}{8T}}$$

With $Z=600$ and $T=100$ $$\sqrt{\frac{Z}{8T}}=.866$$

In the circuit of Figs. 1 and 2 the corresponding quantity was found on measurement to be 2.5.

The following table demonstrates the comparison between the circuit of Figs. 1 and 2 and an ideal conventional circuit.

| | Ideal Convention Circuit, Volts | Circuit of Figs. 1 and 2, Volts |
|---|---|---|
| Transmitter, E. M. F. | 1 | .45 |
| Volts at line terminals | -87 | 1.13 |

This represents a 2.3 db improvement in efficiency for the circuit of Figs. 1 and 2 as compared with the ideal conventional circuit.

A sound-powered transmitter may be used instead of the carbon granules transmitter used in the embodiments of Figs. 1 to 5.

This has the advantage of dispensing with the battery drain of the transmitter-energising current and it becomes possible to obtain greater fidelity of speech reproduction as suitable sound-powered transmitters are available which cause considerably less distortion than granules transmitters.

Against this however the output power obtainable from a sound-powered transmitter is less than that which can be obtained from a granules transmitter. If the same speech output level is required from the subset as is provided in the conventional subset above referred to, more amplification will be required and whilst it is possible to obtain a higher gain from a transistor amplifier than that obtained with the circuit component values referred to above, it is preferable on the whole to use two stages of transistor amplification in cascade.

Figure 6:
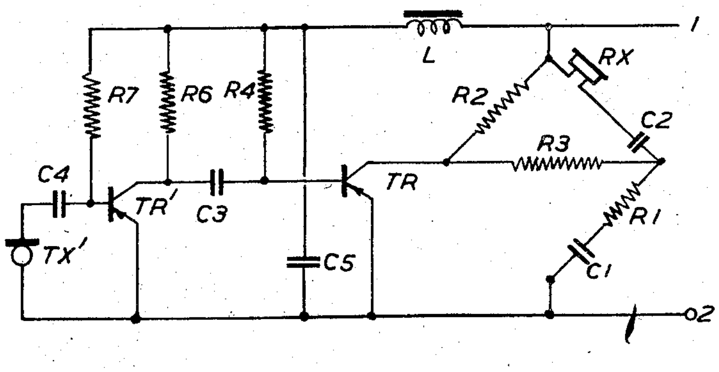
Fig. 6 is a circuit diagram of a fifth embodiment of the invention.

Fig. 6 shows such an arrangement and corresponding items have the same reference characters as in Fig. 1.

By comparison with Fig. 1, L is transferred to the right of R4 to decouple the output of TR fed into the bridge network, from the base bias supply to TR.

The transmitter TX and resistor R5 of Fig. 1 are replaced by a transistor pre-amplifier TR' which receives its current supply through resistors R6 and R7 connecting the collector and base, respectively, of TR' to the D. C. current supply from terminal 1, after passing through L, and condenser C5 is bridged across this supply to prevent feedback round the pre-amplifier stage by decoupling the upper ends of R4, R6 and R7. A sound-powered transmitter TX' feeds the emitter-base input circuit of TR', through a coupling condenser C4.

A gain of about 35 db can readily be obtained from the two stages of amplification shown in Fig. 6.

The arrangement of Fig. 6 lends itself to conversion to a local-battery set arrangement which has the great advantage over the usual local battery set arrangement, using a carbon granules transmitter, that only a small battery of the type commonly used for deaf aids can supply sufficient power even for two cascade transistor amplifying stages whereas it requires at least two dry cells of substantial size to energise a carbon granules transmitter. This battery saving is a factor of first importance in the case of portable telephone sets such as military or linemen's instruments.

The embodiments of the invention above described show the transistors connected in what is known as the "grounded emitter" circuit but the invention is not confined to this particular type of transistor circuit.

While the principles of the invention have been described above in connection with specific embodiments, and particular modifications thereof, it is to be clearly understood that this description is made only by way of example and not as a limitation on the scope of the invention.

What I claim is:

1. A telephone subscriber's station comprising a bridge network, said network having a transmitter circuit and crystal amplifier means coupled across one diagonal of said bridge, a receiver circuit in conjugate relation with said transmitter circuit and coupled across the other diagonal of said bridge, a line circuit constituting a first arm of said bridge, a balancing network in conjugate relation with said line circuit and constituting a second arm of said bridge, and a pair of resistive impedances being respectively the third and the fourth arms of said bridge and constituting ratio arms thereof.

2. A telephone subscriber's station as claimed in claim 1, wherein said line circuit comprises a source of energizing current for said transmitter circuit and said amplifier.

3. A telephone subscriber's station as claimed in claim 1, further comprising a source of energizing current for said transmitter circuit and said amplifier, said source located within said subscriber's station independent of said line circuit.

4. A telephone subscriber's station as claimed in claim 2, further comprising a variable resistance network including non-linear resistance means sensitive to variations in line current received over said line circuit for reducing consequential variations in transmitter circuit energizing voltage, said resistance network coupled in series with said amplifier means.

5. A telephone subscriber's station as claimed in claim 2, further comprising a variable resistance network including non-linear resistance means sensitive to variations in line current received over said line circuit for reducing consequential variations in transmitter circuit energizing voltage, said resistance network coupled in shunt with said amplifier means.

6. A telephone subscriber's station as claimed in claim 1, wherein said transmitter circuit comprises a dynamic microphone.

No references cited.